UNITED STATES PATENT OFFICE.

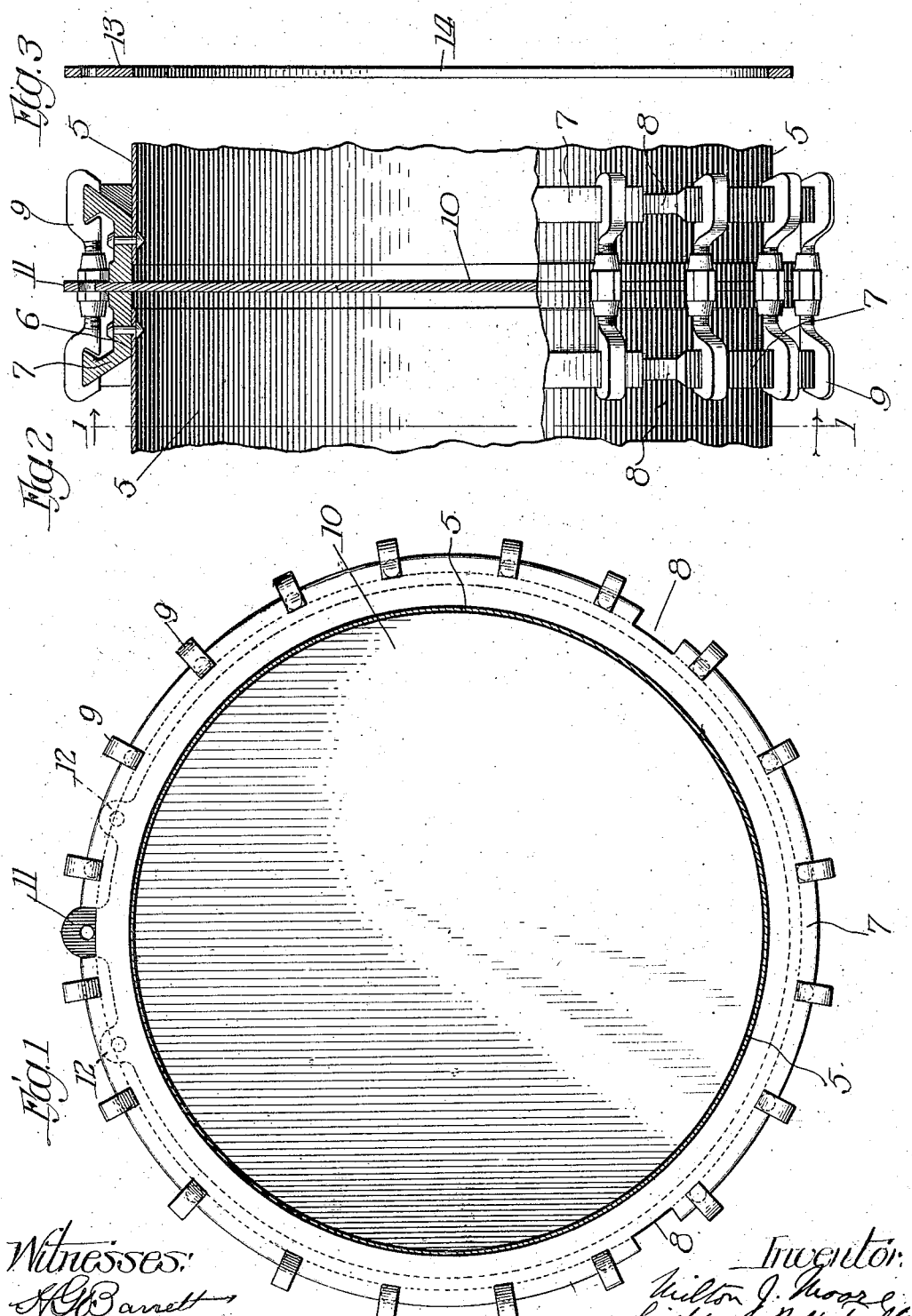

MILTON J. MOORE, OF JOLIET, ILLINOIS.

PLATE-VALVE.

1,150,141.  Specification of Letters Patent.  Patented Aug. 17, 1915.

Application filed November 6, 1911. Serial No. 658,708.

*To all whom it may concern:*

Be it known that I, MILTON J. MOORE, a citizen of the United States, residing at Joliet, in the county of Will and State of Illinois, have invented certain new and useful Improvements in Plate-Valves, of which the following is a specification.

My invention relates to valves, and refers particularly to plate valves adapted for use in pipes or conduits of large diameter.

Heretofore when it has been desired to regulate the passage of gas or other similar fluid through conduits of large diameter it has been customary to employ a so-called spectacle valve, which comprises a plate, one portion of which is solid and the other provided with an aperture. When the gas is to be interrupted in its flow, the plate valve is moved into such position that the solid portion of the plate intersects the cross-section of the conduit, whereas when the gas is to pass freely through the conduit the plate is moved so that the apertured portion of the same corresponds to the cross-section of the conduit. Great difficulties have attended the use of this device, both on account of the fact that the valve cannot be made gas-tight and by reason of the fact that the plate is moved from one position to another only with the expenditure of great force.

The pipes or conduits between which my improved plate valve is used are provided with flanges, and either of two or more separate removable members which constitute a portion of the valve may be placed between said flanges. The first of these members is continuous, whereas the second is in the form of a ring. When one of these removable members has been placed in position the flanges of adjacent pipes are brought into contact with said member by means of turn-buckles, or the like. On the other hand, when the member is to be removed, the turn-buckles are loosened and the flanges are thus slightly separated from the removable member; the turn-buckles on the upper part of the flanges are then slipped around until they are in a plane below the horizontal diameter of the pipes or conduits and the member may then easily be lifted out of its position between the adjacent pipes or conduits. Another removable member with an aperture of the desired size may then be easily placed in position the turn-buckles are adjusted and the flanges are tightened against the valve member, as heretofore described. In this way the leakage of gas is prevented and the whole adjustment of the valve mechanism is easily attained. These and other advantages of my invention will be more readily understood by reference to the accompanying drawings, in which—

Figure 1 is a transverse section through a conduit, taken on the line 1—1 of Fig. 2; Fig. 2 is a partial side elevation and partial longitudinal section of the parts shown in Fig. 1; and, Fig. 3 is a longitudinal section through one of the removable valve members.

The adjacent pipes or conduits 5 are provided near their edges with the flange members 6, preferably held in position by means of rivets or the like. The projecting portion 7 of each of the flange members 6 preferably has flaring surfaces on its outer edge. The portion 7 of each of the flange members 6 is interrupted at intervals, as indicated at 8. Connecting the flange members of adjacent pipes 5 is a plurality of turn-buckles 9, the flange engaging members of which have a shape adapted to engage the portion 7 of each of the flange members 6. A removable valve member 10 is adapted to be inserted between the ends of adjacent pipes to interrupt the supply of gas or other fluid passing through said pipes. The valve member 10 is provided with an apertured boss 11, to which the hoist of a crane may be readily attached, and, if desired, the auxiliary apertured bosses 12 may also be used. In addition to the continuous valve member 10 I also provide a removable valve member 13, which is in the form of a ring having the aperture 14. I may also provide additional valve members having apertures of various sizes, according to the amount of gas or other fluid which it is desired to allow to pass through the conduit.

Having thus described the construction of the parts used in my invention, the operation of the same may now be readily understood. It will be evident that with the parts as shown in Figs. 1 and 2 all communication between the adjacent conduits 5 is interrupted. When it is desired to remove the valve member 10, the turn-buckles 9 are loosened and slipped downwardly on the flange members 6. A hoist of a crane may then be attached to the lugs 11 an.. 12, and on account of the loosening of the turn-buckles 9 the valve member 10 may be easily lifted out of position. The valve member 13 may now be placed in the position formerly occupied by the valve member 10, the turn-buckles are moved to their appropriate positions and tightened, whereby the flange members 6 engage the valve member 13, and the gas is free to flow through the aperture 14, while at the same time the possibility of leakage is avoided on account of the tight connection between the flange members 6 and the valve member 13. If for any reason it is desired to remove one of the turn-buckles 9, it is moved opposite to interrupted portions 8 of the flange members, and may then easily be slipped out of position and a new turn-buckle may be placed in position.

It will be apparent to those skilled in the art that many changes could be made in the detailed construction of the plate valve which I have described without departing from either the spirit or scope of my invention.

What I claim is:

1. In a device of the class described, the combination of two pipes, an angular ring rigidly secured to an end of each pipe, an undercut peripheral flange on each of said rings, a plate located between the ends of adjacent pipes, and a turnbuckle for drawing said pipes into close engagement with said plate, said turn buckle being provided with undercut recesses adapted to engage said flanges, substantially as described.

2. In a device of the class described, the combination of two pipes located in end-to-end relation, a flanged annular ring secured to an end of each pipe, the flange on said ring being undercut and said flange being interrupted at intervals in its periphery, a plate held between the adjacent ends of the pipe, and turnbuckles having undercut recesses in the ends thereof, said turnbuckles being adapted to draw the ends of said pipe in close engagement with said plate, said turnbuckles being removable from said flanges only at the point of interruption of said flanges, substantially as described.

3. A plate valve adapted for use between adjacent pipes, comprising a flange member on each of said pipes, said flange member having a V-shaped projection, a removable valve member adapted to be inserted between said pipes, and a plurality of turnbuckles forming connection between said flange members, the V-shaped portions of which are interrupted at intervals in order to allow the removal of said turn-buckles, substantially as described.

MILTON J. MOORE.

Witnesses:
A. F. DREES,
L. C. BOSTWICK.

Copies of this patent may be obtained for five cents each, by addressing the "Commissioner of Patents, Washington, D. C."